United States Patent [19]

Bennett et al.

[11] 4,118,348

[45] Oct. 3, 1978

[54] METHOD FOR PREPARING BLENDS OF RUBBER, A POLYPHENYLENE ETHER RESIN AND AN ALKENYL AROMATIC ADDITION POLYMER

[75] Inventors: James G. Bennett, Menands; Glenn D. Cooper; Arthur Katchman, both of Delmar, all of N.Y.

[73] Assignee: General Electric Company, Pittsfield, Mass.

[21] Appl. No.: 401,994

[22] Filed: Oct. 1, 1973

[51] Int. Cl.$^2$ ............................................. C08L 7/00
[52] U.S. Cl. ......................... 260/4 AR; 260/874; 260/876 R; 260/878 R; 260/880 R
[58] Field of Search ............... 260/874, 878 R, 880 R, 260/4 AR

[56] References Cited

U.S. PATENT DOCUMENTS

| | | | |
|---|---|---|---|
| 3,663,661 | 5/1972 | Katchman | 260/874 |
| 3,700,750 | 10/1972 | Yamanouchi et al. | 260/874 |

FOREIGN PATENT DOCUMENTS 2,126,434  12/1971  Fed. Rep. of Germany ........... 260/874

*Primary Examiner*—Richard B. Turer
*Attorney, Agent, or Firm*—Morgan, Finnegan, Pine, Foley & Lee

[57] ABSTRACT

A novel process is provided for preparing a blend of rubber, a polyphenylene ether resin and an alkenyl aromatic addition polymer which comprises using an alkenyl aromatic monomer as a solvent for the oxidative coupling of a phenol to a polyphenylene ether resin and thereafter adding a rubber and polymerizing the mixture to form said blend of rubber, an alkenyl aromatic addition polymer and a polyphenylene ether resin.

1 Claim, No Drawings

METHOD FOR PREPARING BLENDS OF RUBBER, A POLYPHENYLENE ETHER RESIN AND AN ALKENYL AROMATIC ADDITION POLYMER

This invention relates to a novel process for preparing blends of rubber, a polyphenylene ether resin and an alkenyl aromatic addition polymer. The process is based on the use of the monomeric alkenyl aromatic compound as a solvent for the oxidative coupling of a phenol. Thereafter, rubber is added and the blend is formed by polymerizing the alkenyl aromatic monomer in the presence of the polyphenylene ether resin.

BACKGROUND OF THE INVENTION

The term "polyphenylene ether resin" includes a family of polymers well known to those skilled in the art, and they are made by a variety of catalytic and non-catalytic processes from the corresponding phenols or reactive derivatives thereof. By way of illustration, certain of the polyphenylene ethers are disclosed in Hay, U.S. Pat. Nos. 3,306,874 and 3,306,875, and in Stamatoff, U.S. Pat. Nos. 3,257,357 and 3,257,358. In the Hay patents, the polyphenylene ethers are prepared by an oxidative coupling reaction comprising passing an oxygen-containing gas through a reaction solution of a phenol and a metal-amine complex catalyst. Other disclosures relating to processes using metal-amine catalysts are found in Bussink et al, U.S. Pat. No. 3,337,499; Blanchard et al, U.S. Pat. No. 3,219,626; Laasko et al, U.S. Pat. No. 3,342,892; Borman, U.S. Pat. No. 3,344,166; Hori et al, U.S. Pat. No. 3,384,619; Faurote et al, U.S. Pat. No. 3,440,217; and disclosures relating to the metal based catalysts which do not include amines, are known from patents such as Wieden et al, U.S. Pat. No. 3,442,885 (copper-amidines); Nakashio et al, U.S. Pat. No. 3,573,257 (metal-alcoholate or -phenolate); Kobayashi et al, U.S. Pat. No. 3,455,880 (cobalt chelates); and the like. In the Stamatoff patents, the polyphenylene ethers are produced by reacting the corresponding phenolate ion with an initiator, such as peroxy acid salt, an acid peroxide, a hypohalite, and the like, in the presence of a complexing agent. Disclosures relating to non-catalytic processes, such as oxidation with lead dioxide, silver oxide, etc. are described in Price et al, U.S. Pat. No. 3,382,212. All of the above-mentioned disclosures are incorporated herein by reference.

Ther term "alkenyl aromatic addition polymer" includes polymers and copolymers of styrene, alpha methyl styrene, chlorostyrene, ethylvinylbenzene, divinylbenzene, vinylnaphthalene and the like and includes graft copolymers of these monomers with rubber.

Ther term "rubber" includes natural and synthetic rubbers, such as the diene rubbers including India rubber, styrene butadiene rubber, acrylonitrile rubber, butyl rubber, neoprene, polybutadiene and polyisoprene. Other synthetic rubbers, such as selected ethylene-propylene copolymers, are also included within the scope of this term.

Most of the prior art processes for preparing compositions which have included alkenyl aromatic addition polymers and polyphenylene ether resins have been based on powder blending followed by several extrusions to form the alloyed material which is suitable for the injection molding of useful articles. The prior art has also employed solution blending techniques to form powder compositions suitable for extrusion blending. This procedure is carried out by first dissolving the components in a suitable solvent and thereafter adding a non-solvent to cause precipitation of both components. The polymeric components are prepared separately and are obtained in substantially pure form by various separation techniques and are thereafter dissolved in an appropriate solvent.

Such procedures have disadvantages, including a high energy cost, the need to use complex equipment, a loss in yield due the number of handling steps required, a loss of economy through solvent and non-solvent evaporation and intermingling, and difficulty in controlling particle size distribution in the product.

It has now been discovered that resinous compositions of a polyphenylene ether resin component, a rubber and alkenyl aromatic addition polymer can be obtained by first polymerizing the polyphenylene ether resin in the alkenyl aromatic monomer. Thereafter the rubber is added to the solution of the polyphenylene ether in the alkenyl aromatic monomer, the alkenyl aromatic monomer is polymerized in the presence of the rubber and polyphenylene ether resin to form the blend.

An advantage of this process resides in the fact that these compositions may be injection molded after a single pass through an extruder. It is especially advantageous when compositions are prepared which have a high content of alkenyl aromatic addition polymers. Lower extrusion temperatures or increased extrusion rates are made possible when high proportions of alkenyl aromatic addition polymers are used.

The advantages over conventional antisolvent precipitation or solution blending are:

(i) the cost of the antisolvent and of recovering the antisolvent from the filtrate is eliminated;

(ii) the cost of independently insolating the alkenyl aromatic addition polymer from its reaction solvent is eliminated;

(iii) the cost of independently insolating the polyphenylene ether resin from its reaction mixture is eliminated;

(iv) no solvent separation procedure is required to directly obtain a blend composition of the rubber-modified alkenyl aromatic addition polymer, alkenyl aromatic addition polymer and polyphenylene ether resin.

A surprising and unexpected result from the process of the present invention is the substantially complete elimination of colored impurities produced in the oxidation of the phenolic monomer. The reactions causing the colored impurities which are usually dark-reddish brown are not known, but it has been found that the subsequent bulk or suspension polymerization of the rubber and an alkenyl aromatic monomer, such as styrene, results in a colorless blend. This type of blend is particularly desirable for formulating white or pastel-colored molding powders.

DESCRIPTION OF THE INVENTION

According to the present invention, there is provided a process for making a composition comprising from 1–25 parts by weight of a rubber; from 5 to 95 parts by weight of an alkenyl aromatic addition polymer component and from 10 to 90 parts by weight of a polyphenylene ether resin component, said process comprising;

(a) providing a first mixture of a phenol, capable of oxidatively coupling to form said polyphenylene ether resin component and an alkenyl aromatic monomer capable of forming an addition polymer;

(b) polymerizing said phenol in said first mixture in the presence of oxygen and said catalyst to produce a second mixture of said polyphenylene ether and said alkenyl aromatic monomer;

(c) providing in said second mixture a rubber to form a third mixture of said polyphenylene ether resin, said rubber and said alkenyl aromatic monomer; and (c) polymerizing said rubber and alkenyl aromatic monomer in said third mixture to form said composition of a rubber-modified alkenyl aromatic addition polymer, an alkenyl aromatic addition polymer and a polyphenylene ether resin.

The phenol capable of oxidatively coupling to form said polyphenylene ether resin component is selected from compounds of the formula

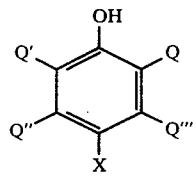

wherein X is selected from the group consisting of hydrogen, chlorine, bromine and iodine, Q is selected from the group consisting of hydrogen, hydrocarbon radicals, halohydrocarbon radicals having at least two carbon atoms between the halogen atom and the phenol nucleus, hydrocarbonoxy radicals having at least two carbon atoms between the halogen atom and the phenol nucleus, Q' and Q" are the same as Q, and in addition, halogen with the proviso that Q, Q' and Q" are all free of a tertiary carbon atom.

The alkenyl aromatic monomer may be selected from those compounds having the formula

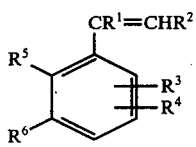

wherein $R^1$ and $R^2$ ae selected from the group consisting of lower alkyl or alkenyl groups of from 1 to 6 carbon atoms and hydrogen; $R^3$ and $R^4$ are selected from the group consisting of chloro, bromo, hydrogen and lower alkyl of from 1 to 6 carbon atoms; $R^5$ and $R^6$ are selected from the group consisting of hydrogen and lower alkenyl and alkenyl groups of from 1 to 6 carbon atoms or $R^5$ and $R^6$ may be concatenated together with hydrocarbyl groups to form a naphthyl group. These compounds are free of any substituent that has a tertiary carbon atom.

Specific examples of alkenyl aromatic monomers include the vinyl aromatic polymers such as styrene, chlorostyrene, alpha-methylstyrene, vinyl xylene, divinylbenzene and vinyl naphthalene.

The rubber may be selected from natural and synthetic rubbers, such as styrene butadiene rubber, acrylonitrile rubber, butyl rubber, neoprene, polybutadienes, such as cis-1,4-polybutadiene and polyisoprenes, such as cis-1,4-polyisoprene. Ethylene propylene copolymers may also be used.

The specific materials required for the practice of the invention are well known and are commercially available.

The catalysts employed for the oxidative coupling of the phenolic compound are described in the literature, the above referenced Hay and Stamatoff patents, or in U.S. Pat. No. 3,400,100. Generally, the oxidative coupling may be carried out using the alkenyl aromatic monomer as a solvent in place of those solvents such as benzene, toluene, xylene, etc. which have been used in the prior art. The catalyst may be left in the reaction mixture, the rubber may be added and the alkenyl aromatic monomer may be polymerized in the presence thereof. The use of a non-catalytic oxidizing agent in an effective amount is also included within the scope of the invention. If desired, the oxidative coupling catalyst may be separated from the polyphenylene ether resin and the alkenyl aromatic monomer prior to adding the rubber and polymerizing said alkenyl aromatic monomer to form the composition of rubber, the polyphenylene ether resin and the alkenyl aromatic polymer. It is understood that the properties of the blend will depend on the particle size of the rubber, the degree of crosslinking of the rubber component, the amount of grafting between the rubber and the alkenyl aromatic addition polymer and other variables. These properties are related to the polymerization conditions employed for the polymerization of the alkenyl aromatic monomer.

After the polyphenylene ether resin is formed and the rubber is added, the alkenyl aromatic monomer may be polymerized by any suitable method, such as by bulk, emulsion or suspension polymerization. The bulk polymerization may be carried out thermally or with a free-radical catalyst, such as benzoyl peroxide; lauroyl peroxide; octanoyl peroxide; 2,4-dichlorobenzoyl peroxide; 1,1-di-t-butyl peroxy-3,5,5-trimethyl cyclohexane and the like.

The polymerization of the rubber and the alkenyl aromatic monomer may be carried essentially to completion, in which case the composition of the final product is determined by the concentration of the phenol in the first-reaction mixture and the amount of rubber that is added. When the process of the invention is employed to produce compositions having relatively high concentrations of a polyphenylene ether resin, i.e., over about 25% by weight, this can be done by separating a portion of the alkenyl aromatic monomer, e.g., by distillation from the polyphenylene ether resin prior to polymerizing said alkenyl aromatic monomer. In an alternate procedure, the polymerization of the alkenyl aromatic monomer may be terminated prior to completion and the unreacted styrene monomer may be recovered leaving a blend having the desired proportions of the respective components.

Procedures for polymerizing the rubber and the alkenyl aromatic monomer may be varied and the particular process is not critical. These procedures are described in the literature such as in B. W. Bender, J. Applied Polym. Sci., 9 2887 (1965); J. Blanchette et al, J. Polym. Sci., 20, 317 (1956); Molau et al, J. Polym. Sci. 4, 1595 (1966) R. Boundy et al, "Styrene—Its Polymers, Copolymers and Derivatives", Reinhold Publishing Company, New York, N.Y. (1952); Wagner, Rubber Chem. & Tech., 43, 1129 (1970) and U.S. Pat. No. 2,694,692 all of which are hereby incorporated by reference.

If desired, the blends obtained by the process of this invention may be formulated into various flame-retardant, stabilized compositions according to techniques well known in the art.

DESCRIPTION OF THE PREFERRED EMBODIMENTS

The process of the present invention is further illustrated in the following examples which are set forth as further descriptions of the invention, but are not to be construed as limiting the invention hereto.

EXAMPLE 1

90 g of lead oxide was added in small portions to a vigorously stirred solution of 20 g of 2,6-xylenol and 0.5 g dodecyltrimethammonium chloride in 180 g of styrene. The mixture was filtered to remove unreacted lead oxide, producing a clear, red-brown solution of polyphenylene ether in styrene. A small portion of this solution was added to methanol and the precipitated polymer was washed with methanol and dried under vacuum. Analysis showed that the polymer consisting of 97% polyphenylene ether, 3% polystyrene.

1.4 g of a poly(butadiene) rubber with a high cis content, Taktene-1202, was dissolved in 14.0 g of the red-brown solution of polyphenylene ether in styrene that was produced above. 40 g of water, 0.06 g of potassium persulfate, 0.02 g of disodium hydrogen phosphate, and 0.40 g of dodecyl sodium sulfate were added, and the mixture was vigorously stirred under nitrogen for 24 hours at 80° C. The mixture was stirred in a Waring blender with a large excess of methanol, washed several times with methanol and with water, and dried under vacuum, yielding 7.4 g of a polymer blend consisting of 38% polyphenylene ether, 52% polystyrene, and 10% rubber. The polymer blend was almost colorless; compression molded films of this were tough and flexible.

EXAMPLE 2

A portion of the reaction mixture produced in Example 1 was distilled under vacuum to remove some of the styrene and increase the concentration of polyphenylene ether to 22%. 6.1 g of this solution was placed in a pressure bottle with 0.6 g of Solprene 203 rubber. The bottle was flushed with nitrogen, sealed, and heated for 64 hours at 100° C. The polymer blend was almost colorless and extremely tough. It was removed by breaking the pressure bottle. It weighed 6.7 g and was largely soluble in hot benzene, but contained an appreciable amount of benzene-unsoluble gel, a graft copolymer of polystyrene and rubber. Analysis showed that the blend contained 25% polyphenylene ether and 45% polystyrene homopolymer, the remainder being insoluble rubber-polystyrene graft copolymer.

EXAMPLE 3

0.81 g of cuprous bromide was stirred for 10 minutes with 4 ml of methanol and 10.9 g of di-n-butylamine in 50 ml of styrene. The catalyst solution was transferred to a one liter stirred reactor with 400 ml of styrene. The mixture was vigorously stirred and oxygen was introduced near the bottom of the vessel at a rate of 0.25 cu. ft./hr. A solution of 70 g of 2,6-xylenol in 82 ml of styrene was added over a period of 15 minutes; the temperature was maintained at 30° C by circulating water from a constant temperature bath through a cooling coil immersed in the reaction vessel. At two hours after the start of the reaction 50 ml of 50% aqueous acetic acid was added and stirring was continued for five minutes. The mixture was centrifuged and the upper phase consisting of a solution of polyphenylene oxide in styrene, was decanted from the aqueous phase containing the polymerization catalyst.

5 g of Vistalon 404 rubber (ethylene-propylene rubber manufactured by Enjay Chemical Co.) was shredded and dissolved in 92 g of the solution of polyphenylene oxide in styrene that was prepared above. The mixture was distilled and 60 g of styrene was removed slowly over a period of several hours. The residue in the pot was precipitated by addition of methanol, yielding 26.6 g of polyphenylene ether-polystyrene-rubber blend. Infrared analysis showed that the product contained 53% polyphenylene ether and 34% polystyrene. The rubber content (determined by difference from 100%) was 13%.

We claim:
1. A process for preparing a composition comprising:
   (1) from 1–25 parts by weight of a rubber and from 5 to 95 parts by weight of alkenyl aromatic addition polymer component and
   (2) from 10 to 90 parts by weight of a polyphenylene ether resin component, said process comprising:
   a. providing a first mixture which consists essentially of a phenol, capable of oxidatively coupling to form said polyphenylene ether resin component and an alkenyl aromatic monomer capable of forming an addition polymer;
   b. polymerizing said phenol by oxidative coupling in said first mixture in the presence of oxygen to produce a second mixture of said polyphenylene ether resin and said alkenyl aromatic monomer;
   c. providing in said section mixture a quantity of a rubber to form a third mixture of said polyphenylene ether resin, said alkenyl aromatic monomer and said rubber; and
   d. polymerizing said rubber and alkenyl aromatic monomer in said third mixture to form said composition of a rubber, an alkenyl aromatic addition polymer and a polyphenylene ether resin.

* * * * *

UNITED STATES PATENT OFFICE
CERTIFICATE OF CORRECTION

Patent No. 4,118,348　　　　　　　Dated October 3, 1978

Inventor(s) James G. Bennett et al

It is certified that error appears in the above-identified patent and that said Letters Patent are hereby corrected as shown below:

In Col. 6, after line 55, please add the following:

-- 2. A process as defined in claim 1 wherein said phenol capable of oxidatively coupling to form said polyphenylene ether resin component (2) is selected from compounds of the formula

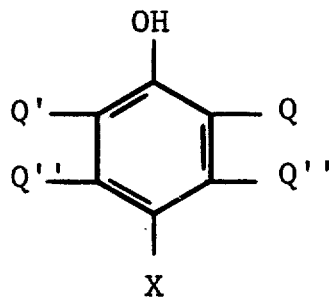

wherein X is selected from the group consisting of hydrogen, chlorine, bromine and iodine, Q is selected from the group consisting of hydrogen, hydrocarbon radicals, halohydrocarbon radicals having at least two carbon atoms between the halogen atom and the phenol nucleus, hydrocarbonoxy radicals and halohydrocarbonoxy radicals having at least two carbon atoms between the halogen atom and the phenol nucleus, Q' and Q'' are the same as Q, and in addition, halogen with the proviso that Q, Q', and Q'' are all free of a tertiary alpha-carbon atom.

3. A process as defined in claim 1 where said alkenyl aromatic compound is selected from the group consisting of styrene, alpha-methylstyrene, vinyl xylene, chlorostyrene, divinylbenzene and vinyl naphthalene.

UNITED STATES PATENT OFFICE

CERTIFICATE OF CORRECTION

Patent No. 4,118,348     Dated October 3, 1978

Inventor(s) James G. Bennett et al

It is certified that error appears in the above-identified patent and that said Letters Patent are hereby corrected as shown below:

4. A process as defined in claim 1 where said rubber is selected from natural rubber, polybutadiene, ethylene propylene copolymer and polyisoprene.

5. A process as defined in claim 1 wherein a catalytic amount of a catalyst for the oxidative coupling of said phenol or an effective amount of an oxidizing agent for the oxidative coupling of said phenol is employed.

6. A process as defined in claim 5 wherein the residue of the catalyst or the oxidizing agent employed to effect oxidative coupling of the phenol is removed prior to initiating polymerization of the alkenyl aromatic compound.

7. A process as defined in claim 6 wherein said catalyst capable of oxidatively coupling said phenol is a copper-amine catalyst.

8. A process as defined in claim 1 wherein the alkenyl aromatic compound is polymerized in a bulk process.

9. A process as defined in claim 1 wherein the alkenyl aromatic compound is polymerized in an emulsion polymerization process.

UNITED STATES PATENT OFFICE
CERTIFICATE OF CORRECTION

Patent No. 4,118,348  Dated October 3, 1978

Inventor(s) James G. Bennett et al

It is certified that error appears in the above-identified patent and that said Letters Patent are hereby corrected as shown below:

10. A process as defined in claim 1 wherein the alkenyl aromatic compound is polymerized in a suspension polymerization process. --

On the Title page below the Abstract, "1 Claim" should read --10 Claims--.

Signed and Sealed this

Sixth Day of February 1979

[SEAL]

Attest:

RUTH C. MASON  
Attesting Officer

DONALD W. BANNER  
Commissioner of Patents and Trademarks

UNITED STATES PATENT OFFICE
CERTIFICATE OF CORRECTION

Patent No. 4,118,348  Dated October 3, 1978

Inventor(s) James G. Bennett et al

It is certified that error appears in the above-identified patent and that said Letters Patent are hereby corrected as shown below:

In Col. 3, lines 14-20, the structure should read as follows:

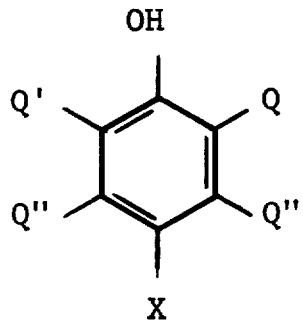

;

on line 42, "ae" should read -- are --.

In Col. 5, line 20, "consisting" should read -- consisted --.

Signed and Sealed this

Seventeenth Day of April 1979

[SEAL]

Attest:

RUTH C. MASON
Attesting Officer

DONALD W. BANNER
Commissioner of Patents and Trademarks